(12) United States Patent
Upton

(10) Patent No.: US 7,516,440 B2
(45) Date of Patent: *Apr. 7, 2009

(54) SYSTEM AND METHOD FOR PROVIDING A JAVA INTERFACE TO AN APPLICATION VIEW COMPONENT

(75) Inventor: Mitch Upton, Highlands Ranch, CO (US)

(73) Assignee: Bea Systems, Inc., Redwood Shores, CA (US)

( * ) Notice: Subject to any disclaimer, the term of this patent is extended or adjusted under 35 U.S.C. 154(b) by 559 days.

This patent is subject to a terminal disclaimer.

(21) Appl. No.: 10/271,162

(22) Filed: Oct. 15, 2002

(65) Prior Publication Data

US 2003/0110315 A1  Jun. 12, 2003

Related U.S. Application Data

(60) Provisional application No. 60/347,919, filed on Oct. 18, 2001, provisional application No. 60/347,901, filed on Oct. 18, 2001.

(51) Int. Cl.
*G06F 9/44* (2006.01)
(52) U.S. Cl. ........................ 717/106; 719/320; 719/328
(58) Field of Classification Search ......... 717/168–174, 717/164, 106; 709/203, 100, 227; 707/10; 719/320, 328
See application file for complete search history.

(56) References Cited

U.S. PATENT DOCUMENTS

| | | | |
|---|---|---|---|
| 5,321,841 A | 6/1994 | East et al. .................. 395/725 |
| 5,469,562 A | 11/1995 | Saether | |
| 5,604,860 A | 2/1997 | McLaughlin et al. | |
| 5,630,131 A | 5/1997 | Palevich et al. | |
| 5,748,975 A | 5/1998 | Van De Vanter ............. 395/793 |
| 5,801,958 A | 9/1998 | Dangelo et al. ............. 364/489 |

(Continued)

FOREIGN PATENT DOCUMENTS

CA    2 248 634    3/2000

(Continued)

OTHER PUBLICATIONS

U.S. Appl. No. 10/271,047, filed Oct. 15, 2002, Mitch Upton.

(Continued)

*Primary Examiner*—Lewis A Bullock, Jr.
*Assistant Examiner*—Michael Yaary
(74) *Attorney, Agent, or Firm*—Fliesler Meyer LLP

(57) ABSTRACT

A Java-based interface can be used to allow a Java client or application to access an application view component. An application view component can provide an interface to an application or enterprise system, using a resource adapter to expose functionality in the enterprise system. A Java-based interface for the resource adapter can allow the Java client to access the application view component. The interface can be a design-time graphical user interface, which can include a set of Java server pages and can be Web-based. The interface can allow a Java client to access the application view component in order to accomplish a task such as creating, defining, deploying, and testing the application view component. Each of these tasks can have their own page in the interface, such as a Java server page.

36 Claims, 4 Drawing Sheets

U.S. PATENT DOCUMENTS

| | | | |
|---|---|---|---|
| 5,835,769 A | 11/1998 | Jervis et al. | 395/701 |
| 5,836,014 A | 11/1998 | Faiman, Jr. | 395/707 |
| 5,862,327 A | 1/1999 | Kwang et al. | 395/200.33 |
| 5,867,822 A | 2/1999 | Sankar | |
| 5,933,838 A | 8/1999 | Lomet | 707/202 |
| 5,944,794 A | 8/1999 | Okamoto et al. | |
| 5,950,010 A | 9/1999 | Hesse et al. | 395/712 |
| 5,961,593 A | 10/1999 | Gabber et al. | 709/219 |
| 5,966,535 A | 10/1999 | Benedikt et al. | 395/707 |
| 6,012,083 A | 1/2000 | Savitzky et al. | |
| 6,016,495 A | 1/2000 | McKeehan et al. | |
| 6,018,730 A | 1/2000 | Nichols et al. | |
| 6,023,578 A | 2/2000 | Birsan et al. | |
| 6,023,722 A | 2/2000 | Colyer | 709/201 |
| 6,028,997 A | 2/2000 | Leymann et al. | 395/701 |
| 6,029,000 A | 2/2000 | Woolsey et al. | 395/705 |
| 6,044,217 A | 3/2000 | Brealey et al. | 395/701 |
| 6,067,623 A | 5/2000 | Blakeley, III et al. | 713/204 |
| 6,070,184 A | 5/2000 | Blount et al. | |
| 6,085,030 A | 7/2000 | Whitehead et al. | 395/200.33 |
| 6,092,102 A | 7/2000 | Wagner | |
| 6,119,149 A | 9/2000 | Notani | 709/205 |
| 6,125,363 A | 9/2000 | Buzzeo et al. | |
| 6,141,686 A | 10/2000 | Jackowski et al. | 709/224 |
| 6,141,701 A | 10/2000 | Whitney | |
| 6,148,336 A | 11/2000 | Thomas et al. | |
| 6,154,738 A | 11/2000 | Call | |
| 6,185,734 B1 | 2/2001 | Saboff et al. | |
| 6,189,044 B1 | 2/2001 | Thomson et al. | |
| 6,212,546 B1 | 4/2001 | Starkovich et al. | |
| 6,222,533 B1 | 4/2001 | Notani et al. | 345/329 |
| 6,226,675 B1 | 5/2001 | Meltzer et al. | |
| 6,226,788 B1 | 5/2001 | Schoening et al. | |
| 6,230,287 B1 | 5/2001 | Pinard et al. | 714/31 |
| 6,230,309 B1 | 5/2001 | Turner et al. | 717/1 |
| 6,237,135 B1 | 5/2001 | Timbol | 717/1 |
| 6,243,737 B1 | 6/2001 | Flanagan et al. | |
| 6,256,676 B1 | 7/2001 | Taylor et al. | |
| 6,269,373 B1 | 7/2001 | Apte et al. | |
| 6,282,711 B1 | 8/2001 | Halpern et al. | 717/11 |
| 6,292,932 B1 | 9/2001 | Baisley et al. | |
| 6,311,327 B1 | 10/2001 | O'Brien et al. | |
| 6,324,681 B1 | 11/2001 | Sebesta et al. | 717/1 |
| 6,330,569 B1 | 12/2001 | Baisley et al. | |
| 6,334,114 B1 | 12/2001 | Jacobs et al. | |
| 6,336,122 B1 | 1/2002 | Lee et al. | 707/204 |
| 6,338,064 B1 | 1/2002 | Ault et al. | 707/9 |
| 6,343,265 B1 | 1/2002 | Glebov et al. | |
| 6,345,283 B1 | 2/2002 | Anderson | |
| 6,348,970 B1 | 2/2002 | Marx | |
| 6,349,408 B1 | 2/2002 | Smith | 717/11 |
| 6,353,923 B1 | 3/2002 | Bogle et al. | 717/4 |
| 6,356,906 B1 | 3/2002 | Lippert et al. | |
| 6,360,221 B1 | 3/2002 | Gough et al. | |
| 6,360,358 B1 | 3/2002 | Elsbree et al. | |
| 6,367,068 B1 | 4/2002 | Vaidyanathan et al. | |
| 6,377,939 B1 | 4/2002 | Young | |
| 6,393,605 B1 | 5/2002 | Loomans | 717/121 |
| 6,408,311 B1 | 6/2002 | Baisley et al. | |
| 6,411,698 B1 | 6/2002 | Bauer et al. | |
| 6,438,594 B1 | 8/2002 | Bowman-Amuah | |
| 6,445,711 B1 | 9/2002 | Scheel et al. | |
| 6,463,503 B1 | 10/2002 | Jones et al. | 711/114 |
| 6,466,239 B2 | 10/2002 | Ishikawa | |
| 6,470,364 B1 | 10/2002 | Prinzing | |
| 6,516,322 B1 | 2/2003 | Meredith | |
| 6,549,949 B1 | 4/2003 | Bowman-Amuah | 709/236 |
| 6,560,636 B2 | 5/2003 | Cohen et al. | |
| 6,560,769 B1 | 5/2003 | Moore et al. | |
| 6,567,738 B2 | 5/2003 | Gopp et al. | |
| 6,584,454 B1 | 6/2003 | Hummel, Jr. et al. | |
| 6,594,693 B1 | 7/2003 | Borwankar | |
| 6,594,700 B1 | 7/2003 | Graham et al. | |
| 6,601,113 B1 | 7/2003 | Koistinen et al. | |
| 6,604,198 B1 | 8/2003 | Beckman et al. | 713/167 |
| 6,609,115 B1 | 8/2003 | Mehring et al. | |
| 6,615,258 B1 | 9/2003 | Barry et al. | |
| 6,636,491 B1 | 10/2003 | Kari et al. | |
| 6,637,020 B1 | 10/2003 | Hammond | |
| 6,643,652 B2 | 11/2003 | Helgeson et al. | |
| 6,654,932 B1 | 11/2003 | Bahrs et al. | |
| 6,662,357 B1 | 12/2003 | Bowman-Amuah | |
| 6,678,518 B2 | 1/2004 | Eerola | |
| 6,684,388 B1 | 1/2004 | Gupta et al. | |
| 6,687,702 B2 * | 2/2004 | Vaitheeswaran et al. | 707/10 |
| 6,687,848 B1 | 2/2004 | Najmi | |
| 6,721,740 B1 | 4/2004 | Skinner et al. | |
| 6,721,779 B1 | 4/2004 | Maffeis | |
| 6,732,237 B1 | 5/2004 | Jacobs et al. | 711/119 |
| 6,738,975 B1 | 5/2004 | Yee et al. | |
| 6,748,420 B1 | 6/2004 | Quatrano et al. | |
| 6,754,884 B1 | 6/2004 | Lucas et al. | |
| 6,757,689 B2 | 6/2004 | Battas et al. | |
| 6,789,054 B1 | 9/2004 | Makhlouf | |
| 6,795,967 B1 | 9/2004 | Evans et al. | 719/310 |
| 6,799,718 B2 | 10/2004 | Chan et al. | |
| 6,802,000 B1 | 10/2004 | Greene et al. | 713/168 |
| 6,804,686 B1 | 10/2004 | Stone et al. | 707/104.1 |
| 6,823,495 B1 | 11/2004 | Vedula et al. | |
| 6,832,238 B1 | 12/2004 | Sharma et al. | |
| 6,836,883 B1 | 12/2004 | Abrams et al. | |
| 6,850,979 B1 | 2/2005 | Saulpaugh et al. | |
| 6,874,143 B1 | 3/2005 | Murray et al. | |
| 6,877,023 B1 | 4/2005 | Maffeis et al. | |
| 6,889,244 B1 | 5/2005 | Gaither et al. | |
| 6,915,519 B2 | 7/2005 | Williamson et al. | |
| 6,918,084 B1 | 7/2005 | Slaughter et al. | |
| 6,959,307 B2 | 10/2005 | Apte | |
| 6,959,340 B1 | 10/2005 | Najmi | |
| 6,963,914 B1 | 11/2005 | Breitbart et al. | |
| 6,971,096 B1 | 11/2005 | Ankireddipally et al. | |
| 6,976,086 B2 | 12/2005 | Sadeghi et al. | |
| 6,985,939 B2 | 1/2006 | Fletcher et al. | |
| 6,993,743 B2 | 1/2006 | Crupi et al. | |
| 7,000,219 B2 | 2/2006 | Barrett et al. | |
| 7,017,146 B2 | 3/2006 | Dellarocas | |
| 7,035,944 B2 | 4/2006 | Fletcher et al. | |
| 7,051,072 B2 | 5/2006 | Stewart et al. | |
| 7,051,316 B2 | 5/2006 | Charisius et al. | |
| 7,054,858 B2 | 5/2006 | Sutherland | |
| 7,069,507 B1 | 6/2006 | Alcazar et al. | |
| 7,072,934 B2 | 7/2006 | Helgeson et al. | |
| 7,089,584 B1 | 8/2006 | Sharma | |
| 7,107,578 B1 | 9/2006 | Alpern | |
| 7,117,504 B2 | 10/2006 | Smith et al. | |
| 7,127,704 B2 | 10/2006 | Van De Vanter et al. | |
| 7,134,072 B1 | 11/2006 | Lovett et al. | |
| 7,143,186 B2 | 11/2006 | Stewart et al. | |
| 7,146,422 B1 | 12/2006 | Marlatt et al. | |
| 7,150,105 B1 | 12/2006 | Battaglia et al. | |
| 7,152,090 B2 | 12/2006 | Amirisetty et al. | |
| 7,165,041 B1 | 1/2007 | Guheen et al. | |
| 7,181,731 B2 | 2/2007 | Pace et al. | |
| 7,184,967 B1 | 2/2007 | Mital et al. | |
| 7,231,421 B2 | 6/2007 | Kawakura et al. | |
| 7,406,664 B1 | 7/2008 | Morton et al. | |
| 2001/0032263 A1 | 10/2001 | Gopal et al. | |
| 2002/0004848 A1 | 1/2002 | Sudarshan et al. | |
| 2002/0010781 A1 * | 1/2002 | Tuatini | 709/227 |
| 2002/0010803 A1 | 1/2002 | Oberstein et al. | |
| 2002/0016759 A1 | 2/2002 | Macready et al. | |
| 2002/0038336 A1 | 3/2002 | Abileah et al. | |
| 2002/0049788 A1 | 4/2002 | Lipkin et al. | |
| 2002/0073080 A1 | 6/2002 | Lipkin | |

| | | | |
|---|---|---|---|
| 2002/0078365 | A1 | 6/2002 | Burnett et al. |
| 2002/0083075 | A1 | 6/2002 | Brummel et al. |
| 2002/0111922 | A1 | 8/2002 | Young et al. |
| 2002/0116454 | A1 | 8/2002 | Dyla et al. |
| 2002/0120685 | A1 | 8/2002 | Srivastava |
| 2002/0138582 | A1 | 9/2002 | Chandra et al. |
| 2002/0143960 | A1 | 10/2002 | Goren et al. |
| 2002/0152106 | A1 | 10/2002 | Stoxen |
| 2002/0152244 | A1 | 10/2002 | Dean et al. |
| 2002/0161826 | A1* | 10/2002 | Arteaga et al. ............... 709/203 |
| 2002/0165936 | A1 | 11/2002 | Alston et al. |
| 2002/0166454 | A1 | 11/2002 | Weiss et al. |
| 2002/0169644 | A1 | 11/2002 | Greene |
| 2002/0174178 | A1* | 11/2002 | Stawikowski ............... 709/203 |
| 2002/0174241 | A1 | 11/2002 | Beged-Dov et al. |
| 2002/0184145 | A1 | 12/2002 | Sijacic et al. |
| 2002/0184610 | A1 | 12/2002 | Chong et al. |
| 2002/0188486 | A1 | 12/2002 | Gil et al. |
| 2002/0188513 | A1 | 12/2002 | Gil et al. |
| 2002/0194221 | A1 | 12/2002 | Strong et al. |
| 2002/0194244 | A1 | 12/2002 | Raventos |
| 2002/0194267 | A1* | 12/2002 | Flesner et al. ............... 709/203 |
| 2002/0194495 | A1 | 12/2002 | Gladstone et al. |
| 2003/0004746 | A1 | 1/2003 | Kheirolomoom et al. |
| 2003/0005181 | A1 | 1/2003 | Bau, III et al. |
| 2003/0014439 | A1 | 1/2003 | Boughannam |
| 2003/0018661 | A1 | 1/2003 | Darugar |
| 2003/0018665 | A1 | 1/2003 | Dovin et al. |
| 2003/0018832 | A1 | 1/2003 | Amirisetty et al. |
| 2003/0018963 | A1 | 1/2003 | Ashworth et al. |
| 2003/0023957 | A1 | 1/2003 | Bau et al. |
| 2003/0028579 | A1* | 2/2003 | Kulkarni et al. ............. 709/100 |
| 2003/0041050 | A1 | 2/2003 | Smith et al. |
| 2003/0041198 | A1 | 2/2003 | Exton et al. |
| 2003/0043191 | A1 | 3/2003 | Tinsley et al. |
| 2003/0046266 | A1 | 3/2003 | Mullins et al. |
| 2003/0046591 | A1 | 3/2003 | Asghari-Kamrani et al. |
| 2003/0051063 | A1 | 3/2003 | Skufca et al. |
| 2003/0055878 | A1* | 3/2003 | Fletcher et al. ............. 709/203 |
| 2003/0065827 | A1 | 4/2003 | Skufca et al. |
| 2003/0069975 | A1 | 4/2003 | Abjanic et al. |
| 2003/0074467 | A1 | 4/2003 | Oblak et al. |
| 2003/0093470 | A1 | 5/2003 | Upton |
| 2003/0110117 | A1 | 6/2003 | Saidenbereg et al. |
| 2003/0126136 | A1 | 7/2003 | Omoigui |
| 2003/0233631 | A1 | 12/2003 | Curry et al. |
| 2004/0068568 | A1 | 4/2004 | Griffin |
| 2004/0078373 | A1 | 4/2004 | Ghoneimy et al. |
| 2004/0133660 | A1 | 7/2004 | Junghuber et al. |
| 2004/0148336 | A1 | 7/2004 | Hubbard et al. |
| 2004/0204976 | A1 | 10/2004 | Oyama et al. |
| 2004/0225995 | A1 | 11/2004 | Marvin et al. |
| 2005/0050068 | A1 | 3/2005 | Vaschillo et al. |
| 2005/0223392 | A1 | 10/2005 | Cox et al. |
| 2006/0085797 | A1 | 4/2006 | Connelly |
| 2006/0234678 | A1 | 10/2006 | Juitt et al. |
| 2007/0038500 | A1* | 2/2007 | Hammitt et al. ................ 705/9 |

FOREIGN PATENT DOCUMENTS

| | | |
|---|---|---|
| EP | 1 006 443 A2 | 6/2000 |
| EP | 1 061 445 A2 | 12/2000 |
| WO | 00/29924 | 5/2000 |
| WO | 01/90884 A2 | 11/2001 |

OTHER PUBLICATIONS

U.S. Appl. No. 10/271,156, filed Oct. 15, 2002, Mitch Upton.
U.S. Appl. No. 10/271,157, filed Oct. 15, 2002, Mitch Upton.
U.S. Appl. No. 10/271,162, filed Oct. 15, 2002, Mitch Upton.
U.S. Appl. No. 10/271,215, filed Oct. 15, 2002, Mitch Upton.
U.S. Appl. No. 10/271,244, filed Oct. 15, 2002, Mitch Upton.
U.S. Appl. No. 10/271,402, filed Oct. 15, 2002, Mitch Upton.
U.S. Appl. No. 10/271,410, filed Oct. 15, 2002, Mitch Upton.
U.S. Appl. No. 10/271,414, filed Oct. 15, 2002, Mitch Upton.
U.S. Appl. No. 10/271,423, filed Oct. 15, 2002, Mitch Upton.
Hewlett-Packard, *HP Application Server*, Technical Guide Version 8.0, HP, Nov. 15, 2001, pp. 1-234.
Sun Microsystems, *iPlanet Application Server 6.0 White Paper*, iPlanet E-Commerce Solutions, May 25, 2000, pp. 1-104.
Enrique Duvos & Azer Bestavros, *An Infrastructure for the Dynamic Distribution of Web Application and Services*, Department of Computer Science Boston University, Dec. 2000, pp. 1-104.
Ed Roman & Rickard Öberg, *The Technical Benefits of EJB and J2EE Technologies over COM+ and Windows DNA*, Enterprise Edition (J2EE) Technologies, Dec. 1999, pp. 1-24.
Marcello Mariucci, *Enterprise Application Server Development Environments*, University of Stuttgart, Oct. 10, 2000, pp. 1-30
C. Moran et al., "ARIES: A Transaction Recovery Method Supporting Fine-Granularity Locking and Partial Rollbacks Using Write-Ahead Logging", ACM Transaction on Database Systems, vol. 17, No. 1, Mar. 1992, pp. 94-162.
"Introducing Microsoft DotNet"; by ChristopheLauer, Jul. 2, 2002; http://web.archive.org/web/20020702162429/http://www.freevbcode.com/ShowCode.asp?ID=2171; pp. 1-10.
Paul, Laura Gibbone, "RosettaNet: Teaching business to work together", Oct. 1, 1999. http://www.developer.com/xml/article.php/616641.
Blake, "Rule-Driven Coordination Agents: A Self-Configurable Agent Architecture for Distributed Control", IEEE, Mar. 2001, pp. 271-277.
Dahalin et al., "Workflow Interoperability Using Extensible Markup Language (XML)", IEEE, Jul. 2002, pp. 513-516.
Kunsitty, "Workflow Modeling and Simulation Using an Extensible Object-Oriented Knowledge Base Management System", CiteSeer, 1996, pp. 1-60.
Van Der Aaslt et al., "Verification of XRL: An XML-Based Workflow Language", IEEE, Jul. 2001, pp. 427-432.
International Search Report for PCT/US04/05488 dated Feb. 9, 2005 (3 pages).
Written Opinion for PCT/US04/05488 mailed Mar. 1, 2005 (5 pages).
International Search Report for PCT/US04/05621 dated Feb. 7, 2005 (1 page).
Written Opinion for PCT/US04/05621 mailed May 11, 2005 (3 pages).
International Search Report for PCTUS04/05622 dated Feb. 25, 2005 (4 pages).
Written Opinion for PCT/US04/05622 mailed Mar. 15, 2005 (5 pages).
Sosnoski, Dennis, "XML and Java Technologies: Data Binding, Part 1: Code Generation Approaches—JAXB and More", IBM, pp. 1-11 (Jan. 2003).
Chen, Jeff, et al., "eCo Architecture for Electronic Commerce Interoperability", Jun. 29, 1999, CommerceNet, Inc., 107 pages.
Liebmann, Erich, et al., "Adaptive Data Dissemination and Caching for Edge Service Achitectures Built with the the J2EE", ACM Press, 2004 ACM Symposium on Applied Computing pp. 1717-1724 (Mar. 2004).
Java™ Debug Interface, definition, retrieved from <URL http://java.sun.com/j2se/1.4.2/docs/guide/jpda/jdi/overview-summary.html on Feb. 21, 2007.
Kilgore, Richard A., "Multi-Language, Open Source Modeling Using the Microsoft.net Architecture," Proceedings of the 2002 Winter Simulation Conference, IEEE, pp. 629-633 (2002).
Embury, Suzanne, M. et al., "Assisting the Comprehension of Legacy Transactions," Proceedings Eighth Working Conference on Reverse Engineering, IEEE, Oct. 2-5, 2001, pp. 345-354.
Mays, Eric, et al., "A Persistent Store for Large Shared Knowledge Bases," IEEE Transactions on Knowledge and Data Engineering, vol. 3, Issue 1, pp. 33-41 (Mar. 1991).
Tang, Chunqiang, et al., "Integrating Remote Invocation and Distributed Shared State, " Proceedings of the 18th International Parallel and Distributed Processing Symposium (IPDPS'04), IEEE, Apr. 26-30, 2004, 10 pages.
Foldoc, :Java Message Service Definition of JMS, http//foldoc.org/?JMS; Jun. 22, 2001, 1 page.

Newcomer, Eric, "Understanding Web Services: XML, WSDL, SOAP, and UDDI," May 2002, 359 pages.

Sun Microsystems, "Java Message Service Version 1.0.2b," Aug. 27, 2001, 118 pages.

XAResource (Java™ 2 Platform EE v.1.4), "Interface XAResource," Dec. 12, 2002, 9 pages.

Altova, "XML-to-XML Mapping," Altova, pp. 1-3 (2007).

BEA, "Transforming Data Using the Xquery Mapper," BEA AquaLogic Service Bus 2.0 Documentation, pp. 1-19 (2006).

Bogunovic, Nikola, "A Programming Model for Composing Data Flow Collaborative Applications," IEEE, 7 pages (Mar. 1999).

Jamper, "Jamper-Java XML Mapper," http://jamper.sourceforge.net/, pp. 1-4 (2007).

Smith, Milton et al., "Marching Towards a Software Reuse Future," ACM Ada Letters, vol. XIV, No. 6, pp. 62-72, (Nov./Dec. 1994).

Sung, S. Y., et al., "A Multimedia Authoring Tool for the Internet," IEEE, pp. 304-308, (1997).

Stylus Studio, Xquery Mapper, Stylus Studios, http://stylusstudio.com/xquery_mapper.html, pp. 1-6 (2007).

Muller, Robert, "Event-Oriented Dynamic Adaption of Workflows: Model, Architecture, and Implementation," Disseration, University of Leipzig, Germany, 351 pages (2002).

Peltz, Chris, "Web Services Orchestration," Hewlett Packard Company, pp. 1-20 (Jan. 2003).

Allamaraju, et al., "Professional Java Server Programming J2EE 1.3 Edition," WROX, pp. 1009-1057 (Sep. 2001).

Alonso, G., et al., "Advanced Transaction Models in Workflow Contexts," Proceedings of the 12th International Conference on Data Engineering, retrieved from http://citeseer.ist.psu.edu/alonso96advanced.html, 14 pages (Feb. 1996).

Microsoft, "Microsoft.net Framework," Microsoft Corporation, pp. 54 pages (2000).

Plaindoux, Didier, "XML Transducers in Jave," The Eleventh International World Wide Web Conference, retrieved from http://www2002.org/CDROM/poster/132/index.html, 6 pages (May 2002).

Sun Microsystems, "J2EE Connector Architecture 1.0," retrieved from: http://www.javasun.com/j2ee/connector/download.html. 188 pages (Aug. 2001).

Supplementary European Search Report for EP 02 78 4131 dated Aug. 8, 2007, 3 pages.

Van Der Aaslst, W.M.P., et al., "XML Based Schema Definition for Support of the Inter-Organizational Workflow," University of Colorado and University of Eindhoven report, retrieved from http://citeseer.ist.psu.edu/vanderaalst00xml.html, 39 pages (2000).

Willink, Edward D., "Meta Compilation for C++, " University of Surrey, 379 pages (Jan. 2000).

* cited by examiner

SYSTEM AND METHOD FOR PROVIDING A JAVA INTERFACE TO AN APPLICATION VIEW COMPONENT

CLAIM OF PRIORITY

This application claims priority to U.S. Provisional Patent Application No. 60/347,919, filed Oct. 18, 2001, entitled "APPLICATION VIEW," as well as Application No. 60/347,901, filed Oct. 18, 2001, entitled "EVENT ADAPTER," each of which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. patent application Ser. No. 10/271,162 entitled "APPLICATION VIEW COMPONENT FOR SYSTEM INTEGRATION," by Mitch Upton, filed Oct. 15, 2002.

U.S. patent application Ser. No. 10/271,244 entitled "SYSTEM AND METHOD FOR INVOKING BUSINESS FUNCTIONALITY FOR A WORKFLOW," by Mitch Upton, filed Oct. 15, 2002.

U.S. patent application Ser. No. 10/271,414 entitled "SYSTEM AND METHOD FOR USING WEB SERVICES WITH AN ENTERPRISE SYSTEM," by Mitch Upton, filed Oct. 15, 2002.

U.S. patent application Ser. No. 10/271,157 entitled "SYSTEM AND METHOD FOR IMPLEMENTING AN EVENT ADAPTER," by Mitch Upton, filed Oct. 15, 2002.

U.S. patent application Ser. No. 10/271,156 entitled "SYSTEM AND METHOD USING A CONNECTOR ARCHITECTURE FOR APPLICATION INTEGRATION," by Mitch Upton, filed Oct. 15, 2002.

U.S. patent application Ser. No. 10/271,047 entitled "SYSTEM AND METHOD FOR IMPLEMENTING A SCHEMA OBJECT MODEL IN APPLICATION INTEGRATION," by Mitch Upton, filed Oct. 15, 2002.

U.S. patent application Ser. No. 10/271,402 entitled "SYSTEM AND METHOD UTILIZING AN INTERFACE COMPONENT TO QUERY A DOCUMENT," by Mitch Upton, filed Oct. 15, 2002.

U.S. patent application Ser. No. 10/271,423 entitled "SYSTEM AND METHOD USING ASYNCHRONOUS MESSAGING FOR APPLICATION INTEGRATION," by Mitch Upton, filed Oct. 15, 2002.

U.S. patent application Ser. No. 10/271,215 entitled "SYSTEMS AND METHODS FOR INTEGRATION ADAPTER SECURITY," by Mitch Upton, filed Oct. 15, 2002.

U.S. patent application Ser. No. 10/271,410 entitled "SYSTEM AND METHOD FOR IMPLEMENTING A SERVICE ADAPTER," by Mitch Upton, filed Oct. 15, 2002.

FIELD OF THE INVENTION

The invention relates generally to the integration of applications.

BACKGROUND

E-commerce has become a major driving factor in the new economy. To be successful in the long-term, e-commerce will require many companies to engage in cross-enterprise collaborations. To achieve cross-enterprise integration, a company must first integrate its internal applications. Using existing technology and tools, application integration can be an expensive proposition. No integration solution exists that is easy to use, affordable, and based on industry standards. Neither does a solution exist that is based on an industry standard infrastructure, has universal connectivity, is capable of massive scalability, and has accessible business process tools.

Application integration to this point has been very inward-focused. Many existing integration systems have not focused on integrating applications between enterprises. Even when integration solutions were used for cross-enterprise integration, the solutions were still narrowly focused and aimed at vertical markets. This inward focus did little to help companies field external business-to-consumer and business-to-business applications, such as applications that can utilize the Internet to generate revenue and reduce costs. The requirement for Internet-enabled applications led to the rise of the application server market. To date, application servers have primarily been used to host external applications targeted at customers and partners. Application servers are themselves packaged applications that, instead of solving a specific problem, are general-purpose platforms that host vertical solutions.

The first attempts at application integration were primarily focused on low-level implementation details such as the format of the data, the byte ordering between machines, and character encoding. The focus on low-level data formats was necessary because, for the first generation of application integration solutions, there were no widely adopted standards for data encoding that could be deployed across multiple vertical applications.

The traditional approach involved connecting individual systems to, in effect, hardwire the systems together. This approach can be complex, as connecting different systems can require an intimate, low-level knowledge of the proprietary technologies of multiple systems.

Present integration systems, which have moved away from "hardwiring" systems together, still suffer from a lack of standards. Each integration vendor typically provides a proprietary solution for application integration, message transformation, message formats, message transport, and routing. Not one of these systems to date has achieved significant market share to enable its technologies to become the de-facto standard. This lack of standards has given packaged application vendors little incentive to integrate these systems with their applications. Further, each of these integration systems or servers has its own proprietary API, such that packaged application vendors cannot leverage development beyond a single integration server. This fragmentation of the integration market has provided little financial incentive for third parties.

BRIEF SUMMARY

Systems and methods in accordance with the present invention can take advantage of a Java-based interface to an application view component. An application view component can be used that provides an interface to an application or enterprise system for a Java client or Java application. A resource adapter can be used to expose functionality in the enterprise system to the Java client application. The resource adapter can be used to define services and events in the enterprise system that are available to the Java client application. A Java-based interface for the resource adapter can allow the Java client application to access the application view component. The Java-based interface can be a design-time graphical user interface, which can include a set of Java server pages and can be Web-based. The Java-based interface can allow a Java client application to access the application view component in order to accomplish a task such as creating, defining, deploying, and testing the application view component. Each of these tasks can have their own page in the interface, such as a Java server page.

Other features, aspects, and objects of the invention can be obtained from a review of the specification, the figures, and the claims.

DETAILED DESCRIPTION

Figure 1:
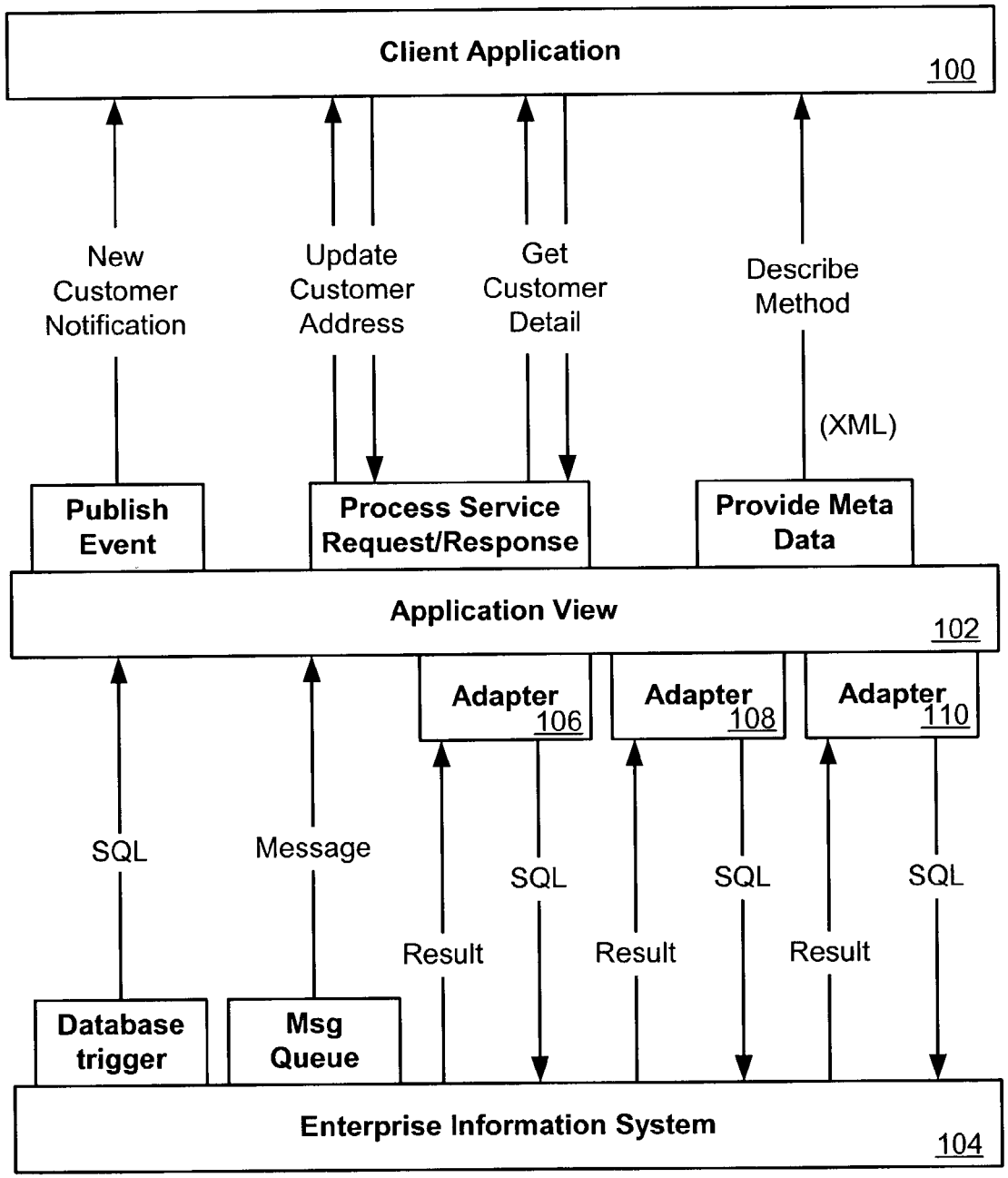
FIG. 1 is a diagram of a system for which a Java interface can be used.

Application integration components can be used to integrate a variety of applications and systems, such as Enterprise Information Systems (EISs). Information technology (IT) organizations typically utilize several highly-specialized applications. Without a common integration platform to facilitate application-level integration, these applications cannot be integrated without extensive, highly-specialized development efforts.

Application integration can utilize adapters to establish an enterprise-wide, united framework for integrating any current or future application. Adapters can simplify integration efforts by allowing each application to be integrated with an application server, instead of requiring that each application being integrated with every other application.

As used herein the terms Java™ and J2EE™ are trademarks of Sun Microsystems, Inc. The term SQL (structured query language) is the trademark of Oracle Corporation and the term XML (extensible markup language) is the trademark of the World Wide Web Consortium held by its host institutions MIT, INRIA and Keio.

The development and widespread acceptance of standards such as the Java 2 Platform, Enterprise Edition (J2EE) from Sun Microsystems, Inc. of Santa Clara, Calif., as well as the eXtensible Markup Language (XML), has laid the groundwork for a standardized approach to the development of these adapters. Perhaps the most significant of these standards for application integration is the J2EE Connector architecture. The J2EE Connector architecture provides a standardized approach for the development of adapters for all types of applications, from legacy mainframe applications, such as CICS from IBM, to packaged applications such as PeopleSoft, Siebel, and SAP. The adoption of such standards enables businesses to develop adapters that work on any J2EE-compliant application server, for example.

Application integration can build on this standardized approach in an application integration framework by providing a standards-based architecture for hosting J2EE Connector architecture-based adapters. Developers can build J2EE Connector architecture-compliant adapters and deploy these adapters, in the integration framework, to connect enterprise applications to an application server.

Adapters

In order to integrate the operations of an enterprise, the data and functions of the various enterprise systems in an organization must be exposed. In the J2EE model, EIS functionality is exposed to Java clients using an adapter, also referred to as a resource adapter or connector, according to the J2EE Connector Architecture. Adapters can be constructed that define services and events. A service represents a message that requests a specific action in the EIS. For example, an adapter might define a service named AddCustomer that accepts a message defining a customer and then invokes the EIS to create the appropriate customer record. An event issues messages when events of interest occur in the EIS. For example, an adapter might define an event that sends messages to interested parties whenever any customer record is updated in the EIS.

These adapters can be used to define business-focused interfaces to an EIS, the interfaces referred to herein as "application views" of the respective adapters. An application view can provide a simple, self-describing, consistent interface to services and events in an application. Application views can make use of an adapter for an EIS, making it possible to expose existing information systems as business services. Unlike adapters, however, an application view does not require users to have intimate knowledge of the EIS or the client interface for that EIS, such that non-programmers or technical analysts can use application views. An application view can provide a business-oriented way for business analysts to access enterprise data without worrying about the programmatic details defined in an adapter. These same users may be otherwise unable to use an adapter directly, due to a lack of familiarity with the EIS.

An application integration component directed at enterprise application integration can have several primary aspects. If the functionality of an EIS such as a PeopleSoft system or an SAP system is to be invoked, an implementation of the J2EE Connector Architecture can be used. If something occurs inside an EIS system, such as a trigger going off, an event can be generated. This event may, in some embodiments, need to be communicated to an external application. An event architecture in an application integration component can handle this communication.

Application Views

An application view can provide significant value to an application integration component. An application view can abstract away much of the complexity in dealing with an application, such as a backend EIS system. Application views can also simplify the way in which adapters are accessed. Application views can provide a layer of abstraction, for example, between an adapter and the EIS functions exposed by that adapter. Instead of accessing an EIS by direct programming a user can simply: edit an adapter's application views, create new application views, or delete any obsolete application view(s). A layer of abstraction formed by application views can help non-programmers maintain the services and events exposed by an adapter. Each application view can be specific to a single adapter, and can define a set of business functions on that adapter's EIS. After an adapter is created, a Web-based interface for the adapter can be used to define application views.

If an application view is used as a primary user interface for an adapter, a number of features can be included that are not commonly found in existing enterprise application integration technologies. Application views can, for example, use XML as a common language among applications. Service and event definitions can be used to expose application capabilities. XML schemas can be used to define the data for services and events. Bidirectional communication can also be supported in adapters.

An application view can be an integral part of an integration framework. An application view can provide a view of the application capabilities exposed by an adapter that a user can customize to meet specific needs. A user can tailor an application view, for example, for a specific business purpose. As a result, the application view can provide an effective alternative to the "one size fits all" approach that many applications provide for the design of a client interface. An application view can be defined for only the business or other capabilities that are applicable for a specific purpose. The capabilities can be customized such as by naming, describing, and defining the data requirements.

In one example of a system using a resource adapter and application view component, shown in FIG. 1, adapters 106, 108, 110 can be developed that allow a client application 100 to communicate with an Enterprise Information System 104 through the use of an application view 102. A developer can begin by coding an adapter that exposes the functionality in the enterprise application that accesses enterprise data. The functionality the adapter exposes could, for example, update records in a database using SQL statements, or could request information from an SAP system using its BAPI or IDOC interfaces. A business analyst, working with the developer, can then define an application view of the adapter using an application view interface.

In addition to defining and implementing adapters, an application integration component can enable a developer to create application views. An application view can provide a layer of abstraction on top of an adapter. Whereas adapters are typically closely associated with specific functionality in the EIS, an application view can be associated with business processes that must be accomplished by clients. An application view can convert the steps in the business process into operations on the adapter.

An application view can expose services and events that serve the business process. An application view control can be associated with a particular application view, and can make the services and methods of the application view available to web services as control methods and callbacks. A variable name used to access a new application view control instance from a web service should be a valid Java identifier.

Figure 2:
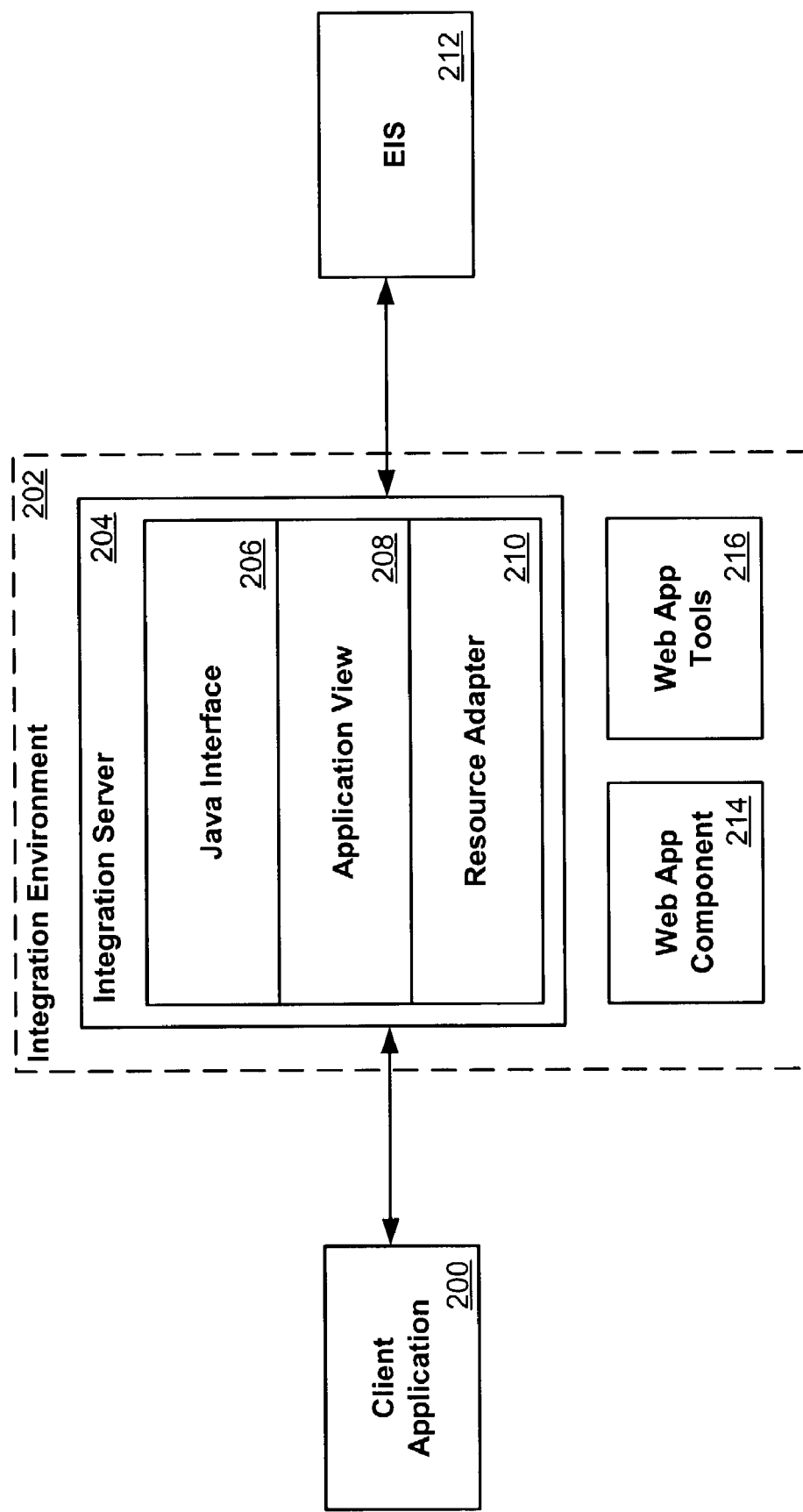
FIG. 2 is a diagram of a system including a server-side Java interface in accordance with one embodiment of the present invention.

An example of a system using a Java interface to an application view component is shown in FIG. 2. In this figure, a client application 200, such as a Java client application or other Java-based client, can communicate with a resource or EIS 210 through an integration server 204. The integration server can be, for example, a web server or application server, and can be included in a cluster or integration system, represented here by the dotted line. The integration server can include an application view component 208 and a resource adapter 210 for the EIS 212. A Java-based interface component 206 can be included that allows the Java-based client application access to the application view 206. The Java interface in this embodiment is contained in the integration environment 202, and specifically in the integration server 204 itself as a server-side component. Other components in the integration environment can include, for example, a Web application component 214 that can be used to generate a Java interface 206, as well as a set of Web application tools 216 that can be used by the Web application component 214, such as may include JSP templates, a tag library, and a JavaScript library.

Figure 3:
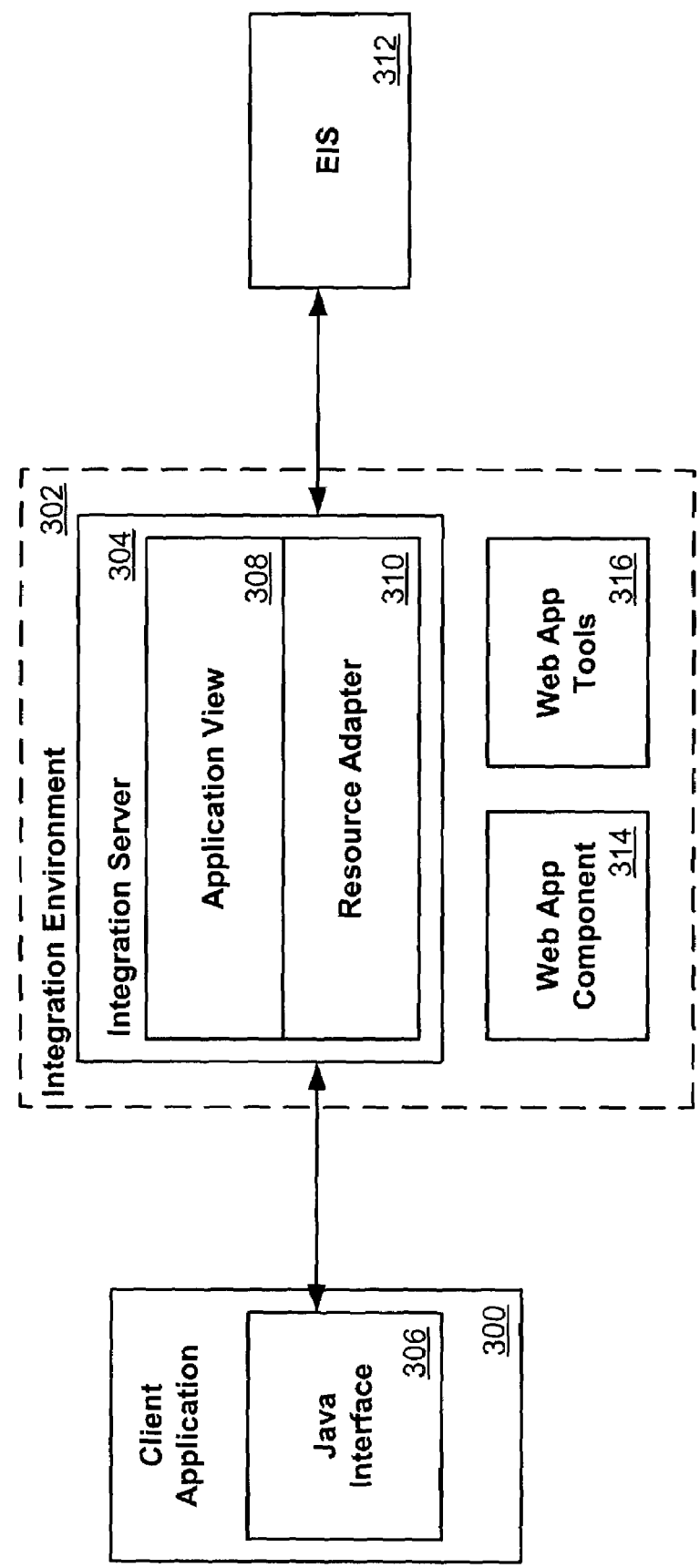
FIG. 3 is a diagram of a system including a client-side Java interface in accordance with another embodiment of the present invention.

Another such system is shown in FIG. 3, except that in this figure the Java interface 306 is a client-side application, such as may utilize client-side code such as JavaScript. In this case, the Java application 306 resides on the Java client application 300, and allows the Java client to access the application view 308 on the integration server 304.

Integration Framework

Application integration can utilize an integration framework, which can provide a systematic, standards-based architecture for hosting application views. Features of such a framework can include application views for exposing application functions and design-time graphical user interfaces (GUIs), such as web-based interfaces that can be used for creating application views. The integration framework utilizes adapters, instead of "hardwiring" enterprise systems together. Once an adapter is deployed for an EIS, other components and applications can use that adapter to access data on the EIS.

A framework in accordance with one embodiment of the present invention relies on XML as the standard format for messages. XML includes XSLT, a standard for transforming XML documents into other XML documents. XSLT is designed for use as part of XSL, which is a stylesheet language for XML. In XSLT, an XML document is used to specify the operations to perform on a class of XML documents in order to transform the documents' structure and content. An XSLT transformation can make use of any of the operations built into the Java programming language, or can make use of custom operations written either in Java or in native code. An integration framework allows a business process to invoke an XSLT engine in order to transform XML messages.

An integration framework can also rely on standards for transporting messages such as Java Message Service (JMS) and HTTPS. JMS is a standard API for interfacing with message transport systems. Using JMS, a framework can utilize any message transport mechanism that provides a JMS interface. The J2EE Connector architecture standard does not specify a message transport mechanism, but an application integration framework can specify such a transport mechanism.

An integration framework can be based on an existing standard infrastructure, such as an application server that supports J2EE, JMS, and the J2EE Connector architecture. Using such a standard infrastructure also provides for high availability and scalability, such as by clustering and resource pooling. The framework can provide for universal connectivity by enabling the construction of XML-based application adapters that can connect to any legacy and packaged application. An adapter development kit can be used to allow users such as customers, system integrators, and packaged application vendors to quickly develop J2EE connector architecture-compliant and integration framework-based adapters. The framework can utilize XML, which means that the same data format can be used for both within- and between-enterprise integration, since many e-commerce systems use XML as the standard message format.

An integration framework can also utilize a business-process engine to allow non-programmers to graphically construct and maintain business processes. An integration framework can implement a common model on top of the J2EE Connector architecture that is focused on business-level concepts. This model, which can consist of XML-encoded events and services, allows the management of a consistent integration environment, regardless of the interface required between adapters and their target applications. The business processes can react to events generated by applications, and they can invoke an application's functionality via services that are exposed by an application adapter.

Editing Application Views

An existing application view can be modified to, for example: account for definition errors, incomplete definition, change in business purpose, or change in underlying application connectivity. The resulting application view can satisfy the business data requirements and can perform the proper interaction with applications. In order to edit an application view, it can be necessary to first identify the application view and verify that it exists. The technical analyst can enlist the help of a subject matter expert to assist in defining the application view by offering application expertise, and possibly by modifying the application or its metadata to meet the needs of the application view. It is necessary, in some embodiments, that the adapter for the application selected by the technical analyst has been installed, and that the appropriate JSP-based design-time GUI has been installed. The server hosting the adapter and the design-time interface should also be up and running.

Figure 4:
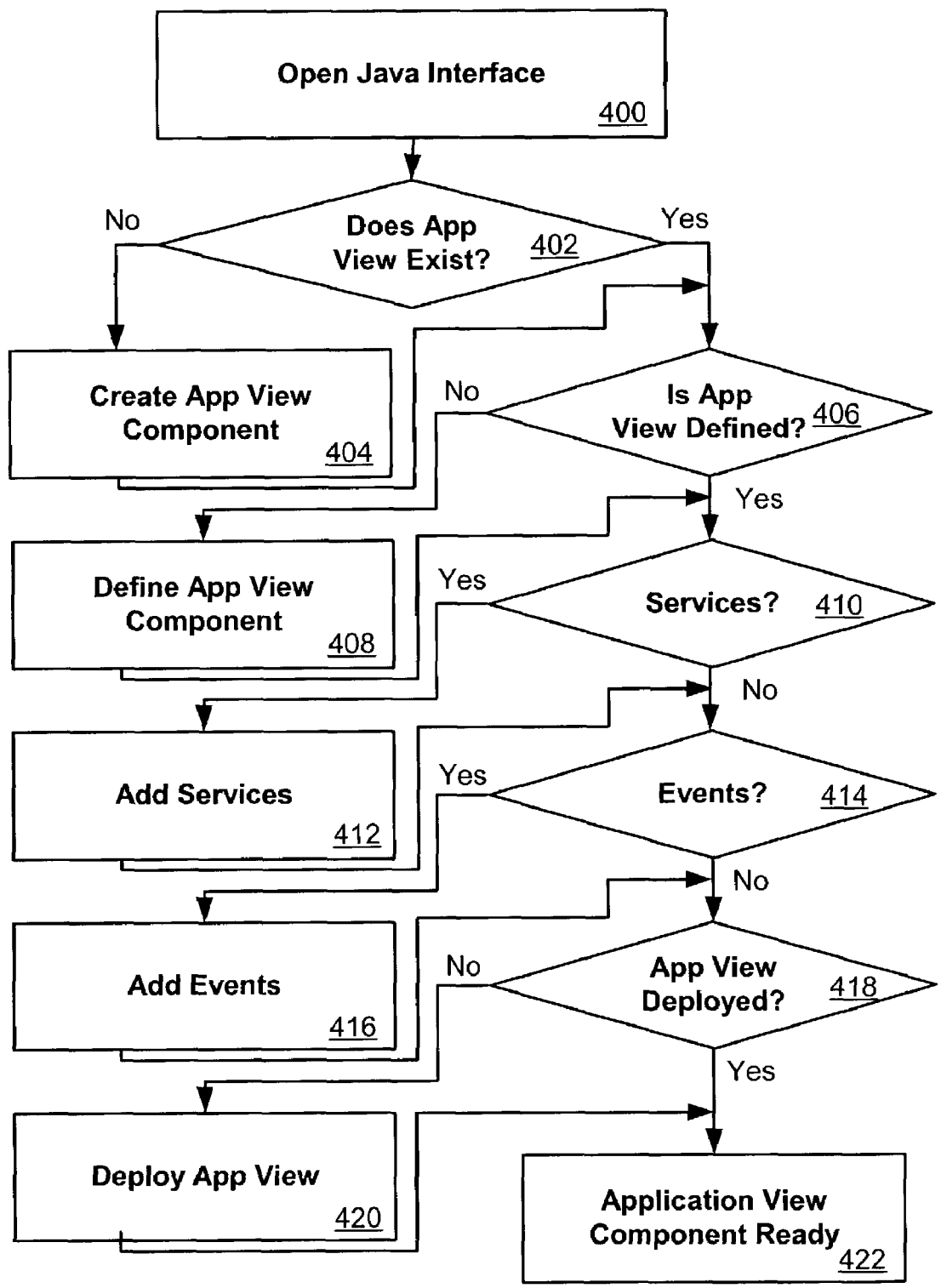
FIG. 4 is a flowchart of a method that can be used with the systems of FIGS. 2 and 3.

Using the appropriate JSP- or Java-based interface, a Java client or Java application can create or modify an application view component using a method such as that shown by the flowchart of FIG. 4. The Java client can open the Java interface 400. The client application or user of the application can determine whether the appropriate application view exists 402. If not, the application view can be created 404, such as by using a Web application component. Once the application view exists, the user can determine whether the application view is defined 406. If not, the user can define the application view 408, such as by using a "Define App View" JSP in the Java interface. If there are services to be added 410, the user can add services 412 such as by using an "Add Services" JSP. If there are events to be added 414, the user can add events 414 such as by using an "Add Events" JSP.

The basic flow, as well as alternate flows, can assume that the business analyst, technical analyst, and subject matter expert are all interacting during the creation/definition of the application view. In the case that each user is taking a turn reviewing the current state of the application view, the flow of events can take the form of multiple passes through the flow of events, with each pass representing only the single user interactions.

To edit services and events for an application view, a technical analyst can browse a metadata tree of the application and identify the proper metadata to represent the event or service. The technical analyst can then create an event or service that is specific to the adapter and its design-time interface capabilities. An event or service definition can be created and added to the application view. What the definition contains can be specific to the adapter, but the definition can contain enough information for the event adapter to properly generate events of the requested type at runtime.

Along with event and service adapters, an ADK design-time framework can provide the tools needed to build a Web-based GUI that adapter users need to define, deploy, and test their application views. Although each adapter can have EIS-specific functionality, each adapter can also require a GUI for deploying application views. This framework can minimize the effort required to create and deploy these interfaces. This minimization can be accomplished at least in part by using two primary components. One such component is a Web application component that allows a user to build an HTML-based GUI by using, for example, Java Server Pages (JSP). This component can be augmented by tools such as JSP templates, a tag library, and the JavaScript library. A second such component is a deployment helper component or request handler that can provide a simple API for deploying, undeploying, and editing application views on an application server.

ADK classes, interfaces, methods, and constructors can be defined in Javadocs included in a development kit. An ADK can employ a build process based upon Ant, a 100% pure Java-based build tool. For the ADK, Ant can facilitate creating a Java archive (.jar) file for the adapter, creating .war file for an adapter's Web application, creating a .rar file for a J2EE-compliant adapter, and encapsulating the above listed components into a .ear file for deployment.

Traditionally, build tools are inherently shell-based. They evaluate a set of dependencies and then execute commands, not unlike those that would be issued on a shell. While it can be simple to extend these tools by using or writing any program for a user-specific operating system, the user is typically limited to that operating system (OS), or at least that OS type.

Ant can be preferable to shell-based make tools for several reasons. For instance, instead of a model that is extended with shell-based commands, the model can be extended using Java classes. Instead of writing shell commands, the configuration files can also be XML-based, calling out a target tree where various tasks get executed. Each task can be run by an object that implements a particular task interface. While this can remove some of the expressive power inherent in being able to construct a shell command, it can give an application the ability to be cross-platform. Also, if a user wants to execute a shell command, Ant has an execute rule that can allow different commands to be executed based on the OS upon which it is executing.

Graphical User Interface (GUI)

An integration framework can provide a way for developers to provide a design-time GUI for each adapter. A design-time GUI can provide a way to: create application views; to add services and events to application views; and to deploy, test, and edit application views. An application view console can be included in a GUI to help a user access, organize, and edit all application views in an enterprise. An application view console can be used to create new folders and add new application views to the folders. These new folders can allow a user to organize application views according to a particular navigation scheme, regardless of the adapter being used by the application view.

An application view can be removed when it becomes obsolete or the application is retired. An application view can be removed in some embodiments only if certain conditions are true. One such condition is that the user has undeployed the application view. Another condition is that the user is logged onto the application server with the appropriate write privileges. To remove a folder, a user can first remove all application views and subfolders in that folder. The user can then remove or delete the folder.

Application integration configuration data can be stored in the same repository as data for business process management (BPM). Therefore, the same tools can be used to migrate application integration when migrating BPM data. However, there can be special considerations for migrating application integration data and deploying the migrated data in the target environment. Migrating application integration data can be straightforward between application server domains and an EIS when instances do not change. However, if the EIS instances change, special procedures may need to be followed in order to ensure a working solution in the target environment.

In some instances it may be desirable to migrate application integration data between application server domains when the EIS instances involved do not change. An example of this type of migration involves moving application view definitions between repositories for different domains of application integration. In this case, only the application integration domain changes, but the target EIS instances referred to in the application views remain the same. Here, an import/export utility can be used to make migrating data simple. For BPM, this can involve exporting a package from BPM in the source domain, and importing that package into BPM in the target domain.

A file structure used to build a design-time GUI adapter can be similar to that required for service adapters. The design-time interface for each adapter can be a J2EE web application that is bundled as a .war file. A web application can be a bundle of .jsp, .html and image files. A Web application descriptor, such as adapters/ADAPTER/src/war/WEB-INF/web.xml, can instruct the J2EE web container how to deploy and initialize the web application.

Developing a Design-Time GUI for Adapters

A design-time framework can provide tools that a user can use to build a web-based GUI that adapter users need to define, deploy, and test their application views. Although each adapter can have EIS-specific functionality, all adapters can require a GUI for deploying application views. A design-time framework can minimize the effort required to create and deploy these interfaces, primarily by using two components in one embodiment. One such component is a web application component that allows a user to build an HTML-based GUI using Java Server Pages (JSP). This component can be augmented by tools such as JSP templates, a JSP tag library, and a JavaScript library. Another such component is a request handler class, such as abstractDesignTimeRequest-Handler, which can provide a simple API for deploying, undeploying, copying, and editing application views on an application server.

There are a variety of approaches to processing forms using Java Servlets and JSPs. A basic requirement of one form processing approach is to display an HTML form, such as by generating the form layout using HTML. It can be indicated to the user which fields are mandatory and which fields can be populated with defaults, if they exist. When a user submits the form data, the field values in the HTTP request can be validated. In order to validate the request, logic can be supplied to determine if all mandatory fields have a value. For each value submitted, the value can be validated against a set of constraints. If any field values are invalid, the form can be redisplayed to the user with an error message next to each erroneous field on the form. The error message can be localized for the user's preferred locale if the web application supports multiple locales. In addition, the user's last input can be redisplayed so the user does not have to re-input any valid information. The web application can loop as many times as needed until all fields submitted are valid.

Once all fields have passed coarse-grained validation, the form data can be processed. While processing the form data, an error condition can be encountered that does not relate to individual field validation, such as a Java exception. The form may need to be re-displayed to the user with a localized error message at the top of the page. All input fields can be saved so the user does not have to re-enter any valid information. It can be determined which object or method implements the form processing API, as well as how and when to advance the user to the next page in the web application. If the form processing succeeds, the next page in the web application can be displayed to the user.

The Flow of Events

When developing a design-time GUI, there are certain items that may need to be considered before commencing with design-time GUI development. The user can determine the adapters to be supported, such as event and/or service adapters. The user can also determine the approach to be used for browsing.

The EIS can supply functions to access the event/service catalog. If the EIS does not supply these, the user may not be able to browse the catalogs. If the EIS does supply them, a call from the design-time UI to get metadata from the EIS can be made, which is similar to a call from a run-time component. Both can execute functions on a back-end EIS. Consequently, a user may need to leverage a run-time architecture as much as possible to provide the design-time metadata features. Design-time specific functions can be invoked that use a CCI Interaction object.

A user can also determine schema generation, or how an adapter will generate a request/response schema for a service. An adapter may need to call the EIS to get metadata about a function or event. The adapter can transform the EIS metadata into XML schema format. To make this happen, a user can invoke, for example, a schema object model (SOM) component, such as a SOM API.

A user can also determine the order in which the JSPs will appear when the user displays the application view. The application view is a secure system, therefore, the user can be required to log in before he or she can implement the view. A logon page may therefore be the first page a user sees. To use a logon page, the user can supply a username and password. That information can be validated to ensure that the user is a member of the adapter group in the appropriate security realm.

Once a user successfully logs in, an Application View Management page can appear. This page can list or display folders that contain the application views, the status of these folders, and any action taken on them. From this page, a user can either view existing application views or add new ones. To view an existing application view, the user can select the appropriate folder and "drill down" to the desired application view. The user can select the application view, causing an Application View Summary page to appear. From here, a user can simply select an option to add an application view.

A definition page, such as defappvw.jsp, can allow a user to define a new application view in any folder in which the client is located. To do this, the user can provide a description that associates the application view with an adapter. If the new application view is valid, the user can configure the connection. A configure connection parameters page, such as confconn.jsp, can provide a form for the user to specify connection parameters for the EIS. Since connection parameters can be specific to every EIS, this page can be different across all adapters. When a user submits connection parameters, the adapter can attempt to open a new connection to the EIS using the parameters. If successful, the user can be forwarded a page for administering the application view.

A page can be provided that includes a summary of an undeployed application view. Specifically, the page can show information such as the connection criteria, a list of events, and a list of services. For each event on the application view, the user can view the appropriate XML schema, remove the event, or provide event properties. For each service on the application view, the user can view the request XML schema, view the response XML schema, or remove the service.

A user interface can include at least one page or section to allow a user to add new events and/or to an application view. Such a page can help to ensure that each event/service has a unique name, and that the name is proper. For example, an event name in one embodiment can only contain characters such as a-z, A-Z, 0-9, and underscore (_) and must begin with a letter. Spaces, dots, and commas may not be allowed. The length of the name may not be able to exceed 256 characters. The event name can also be unique to the application view. If a user specifies an event name that is not unique, the form can reload with an error message indicating that the event is already defined. A user may also be able to specify a description for the event, as well as any appropriate EIS parameters.

Once a user adds at least one service or event, he or she can deploy the application view. Deploying an application view makes it available to process events and services. From a deployment page, a user can specify, for example, connection pooling parameters, minimum pool size, maximum pool size, and a target fraction of the maximum pool size (between 0 and 1), as well as specifying whether the pool is allowed to shrink and which logging level to use. Logging levels can include levels to log all messages; log informationals, warnings, errors, and audit messages; log warnings, errors, and audit messages; and log errors and audit messages. A user can also have the ability to apply security restrictions for the application view, such as by clicking on a link that restricts access.

Form Processing Classes

Implementing the a processing method as described above for every form in a web application can be quite a tedious and error prone development process. A design-time framework can simplify this process using a Model-View-Controller (MVC) paradigm. There are five classes involved in one form processing mechanism. One such class is a RequestHandler class. This class can provide HTTP request processing logic. This class can be the model component of the MVC-based mechanism. This object can be instantiated by a ControllerServlet and saved in an HTTP session under the key handler.

A ControllerServlet class can be used that is responsible for receiving an HTTP request, validating each value in the request, delegating the request to a RequestHandler for processing, and determining which page to display to the user. ControllerServlet can use Java reflection to determine which method to invoke on the RequestHandler. ControllerServlet can look for an HTTP request parameter, such as "doAction", to indicate the name of the method that implements the form processing logic. If this parameter is not available, ControllerServlet may not invoke any methods on the RequestHandler. ControllerServlet can be configured in a file such as web.xml for the web application. ControllerServlet can be responsible for delegating HTTP requests to a method on a RequestHandler.

An ActionResult class can encapsulate information about the outcome of processing a request. ActionResult can also provide information to ControllerServlet to help determine the next page to display to the user. A Word class, as well as its descendants, can supply logic to validate form fields, as all fields in a web application can require some validation. If any fields are invalid, a Word object can use a message bundle to retrieve an internationalized/localized error message for the field.

A tag class, such as an AbstractInputTagSupport class, as well as its descendants, can be responsible for generating the HTML for a form field and pre-populating its value with a default, if applicable. A tag class can also be responsible for displaying a localized error message next to the form field if the supplied value is invalid. A tag class can also be responsible for initializing a Word object and saving it in web application scope so that the validation object is accessible by the ControllerServlet using the form field's name.

Additionally, a submit tag such as <adk:submit name='xyz_submit' doAction='xyz'/> can ensure that the doAction parameter is passed to the ControllerServlet in the request. This can result in the ControllerServlet invoking the xyz( ) method on the registered RequestHandler.

Design-Time Features

Design-time development can have features different from those associated with run-time adapter development. For example, a design-time GUI can be comprised of a set of ten Java Server Pages. JSPs are simply HTML pages that call Java servlets to invoke some transaction. To the user, the JSP can look just like any other web page. The JSPs that comprise a design-time GUI can include, for example:

display.jsp—a display page, also called the Adapter Home Page; this page can contain the HTML necessary to create the look-and-feel of the application view login.jsp—an Adapter Design-Time Login page confconn.jsp—a Confirm Connection page; this page can provide a form for the user to specify connection parameters for the EIS.

appvwadmin.jsp—an Application View Administration page; this page can provide a summary of an undeployed application view addevent.jsp—an Add Event page; this page can allow a user to add a new event to an application view addservc.jsp—an Add Service page; this page can allow a user to add a new service to an application view edtevent.jsp—an Edit Event page can allow users to edit events edtservc.jsp—an Edit Service page can allow users to edit services depappvw.jsp—a Deploy Application View page can allow a user to specify deployment properties appvwsum.jsp—a Summary page; this page can display information about an application view such as: the Deployed State, or whether the application view is deployed or undeployed; the Connection Criteria; Deployment Information (pooling configuration, log level, and security); a list of Events; and a List of Services.

JSP Templates

A design-time framework can provide a set of JSP templates for rapidly assembling a web application to define, deploy, and test a new application view for an adapter. A template is an HTML page that is dynamically generated by a Java Servlet based on parameters provided in the HTTP request. Templates can be used to minimize the number of custom pages and custom HTML needed for a web application. Templates can provide at least three primary features for adapter developers. For example, design-time templates can provide most of the HTML forms needed to deploy an application view. Custom forms can be used to collect the EIS-specific connection parameters, collect the EIS-specific information needed to add an event, and/or to collect the EIS-specific information needed to add a service. In addition, a custom JSP can be used for browsing a metadata catalog for an EIS.

Templates can leverage the internationalization and localization features of the Java platform. The content of every page in the web application can be stored in a message bundle. Consequently, a web interface for an adapter can be quickly internationalized. Templates can also centralize look-and-feel into a single location.

Design-Time Interface

A design-time UI can be deployed as a J2EE web application from a .war file. A .war file is a .jar file with a web application descriptor in WEB-INF/web.xml in the .jar file. However, the .war file does not allow the J2EE Web container in the application server to re-compile JSPs "on the fly." Consequently, a user may need to restart the application server just to change a JSP file. Since this goes against the spirit of JSP, a workaround such as the following can be used to update JSPs without restarting the application server. A user can construct a valid .war file for the adapter's design-time UI. An Ant target can construct a valid .war file for the design-time interface in a library directory such as PROJECT_ROOT/lib, where PROJECT_ROOT is the location under the application integration installation where the developer is constructing the adapter. In addition, this target can perform an "unjar" operation in the /lib directory. This can extract the .war into a temporary directory.

Next, the user can load a web application into the application server and configure the development environment. To load the web application into the application server, the user can edit the config.xml file for the user domain. The following sample code shows the name of adapter development tree:

```
<Application Deployed="true"
    Name="SAMPLE_ADK_Web"
    Path="HOME\adapters\PROJECT_ROOT\lib">

<WebAppComponent Name="SAMPLE_ADK_Web"
    ServletReloadCheckSecs="1"
    Targets="myserver"
    URI="SAMPLE_ADK_Web"/>

</Application>
```

To change a JSP, the user can change the page in the temporary directory, change it from the src/war directory, then rebuild the war target. When the .war file is created, it can also be extracted into a directory that the application server is watching. The application server may pick up the changes to the specific JSP only.

Finally, the user can precompile JSPs when the server starts. This saves the user from having to load every page before knowing if the pages will compile correctly. To enable precompilation, code such as the following can be used:

```
<context-param>
    <param-name>application.jsp.precompile</param-name>
    <param-value>true</param-value>
</context-param>
```

The user can also pre-compile JSPs using a JSP compiler when the user builds a .war target using Ant. This can be accomplished by creating the directory where the application server looks for JSP servlet classes at run time. A JSP compiler such as jspc can be invoked, which pre-compiles all the JSPs for a web application and places them in the appropriate directory for the web application.

Implementing the Design-Time GUI

In order to implement a design-time GUI, a user may need to implement a class such as DesignTimeRequestHandler. This class can accept user input from a form and perform a design-time action. To implement this class, the user can extend a request handler such as AbstractDesignTimeRequestHandler. Such a request handler can provide utility classes for deploying, editing, copying, and removing application views on an application server. It can also provide access to an application view descriptor. The application view descriptor can provide the connection parameters, list of events, list of services, log levels, and pool settings for an application view.

At a high-level, an AbstractDesignTimeRequestHandler can provide an implementation for all actions that are common across adapters. Specifically, these actions can include defining the application view, configuring the connection, deploying the application view, providing application view security, editing the application view, and undeploying the application view.

To ensure these actions, a user can supply certain methods when creating a concrete implementation of AbstractDesignTimeRequestHandler. One such method is initServiceDescriptor( ), which can add a service to an application view at design time. An initEventDescriptor( ) or similar method can add an event to an application view at design time. In every concrete implementation of AbstractDesignTimeRequestHandler, two methods can be included. One such method can be given by:

```
protected String getAdapterLogicalName( );
```

This method can return an adapter logical name, and can be used to deploy an application view under an adapter logical name. Another such class can be given by:

```
protected Class getManagedConnectionFactoryClass(
    );
```

This method returns the SPI ManagedConnectionFactory implementation class for the adapter.

HTML Forms for Design-Time GUI

A final step to implementing a design-time GUI is to write the various forms that comprise the interface. A user can create a confconn.jsp form. This page provides an HTML form for users to supply connection parameters for the EIS. The user can be are responsible for providing this page with the adapter's design-time web application. This form can post to the ControllerServlet with an action such as "doAction=confconn." This implies that the RequestHandler for the design-time interface should provide a method such as, for example:

```
public ActionResult confconn(HttpServletRequest
    request) throws Exception
```

The implementation of this method can be responsible for using the supplied connection parameters to create a new instance of the adapter's ManagedConnectionFactory. The ManagedConnectionFactory can supply the CCI ConnectionFactory, which can be used to obtain a connection to the EIS. Consequently, the processing of the confconn form submission can verify that the supplied parameters are sufficient for obtaining a valid connection to the EIS.

Implementing Confconn( )

A request handler such as AbstractDesignTimeRequestHandler can provide an implementation of a confconn( ) method. Such an implementation can leverage the Java Reflection API to map connection parameters supplied by the user to setter methods on the adapter's ManagedConnection-Factory instance. A user may only need to supply the concrete class for the adapter's ManagedConnectionFactory by implementing a method such as:

public Class getManagedConnectionFactoryClass( )

A user can also create an add event form such as addevent.jsp. This form allows the user to add a new event to an application view. This form can be EIS specific. An example of code creating an addevent.jsp form can be given by:

```
<%@ taglib uri='/WEB-INF/taglibs/adk.tld' prefix='adk' %>
<form method='POST' action='controller'>
    <table>
        <tr>
            <td><adk:label name='eventName' required='true'/></td>
            <td><adk:text name='eventName' maxlength='100'
                size='50'/></td>
        </tr>
        <tr>
            <td colspan='2'><adk:submit name='addevent_submit'
                doAction='addevent'/></td>
        </tr>
    </table>
</form>
```

A user can post a ControllerServlet using a line such as:
<form method='POST' action='controller'>
This line instructs the form to post to the ControllerServlet. The ControllerServlet can be configured in the web.xml file for the web application and can be responsible for delegating HTTP requests to a method on a RequestHandler. The user may not need to provide any code to use the ControllerServlet; however, the user may need to supply the initial parameters.

A user can display the label for the form field using a line such as: <adk:label name='eventName' required='true'/>. This line can display a label for a field on the form. The value that is displayed can be retrieved from the message bundle for the user. The "required" attribute can indicate whether the user must supply this parameter to be successful.

A user can display a text field size using a line such as <adk:text name='eventName' maxlength='100' size='50'/>. This line sets a text field of size 50 with maximum length (max length) of 100.

A user can display a submit button on a form using a line such as <adk:submit name='addevent_submit' doAction='addevent'/>. This line displays a button on the form that allow the adapter user to submit the input. The label on the button can be retrieved from the message bundle using a key such as an addevent_submit key. When the form data is submitted, a ControllerServlet can locate the addevent( ) method on the registered request handler and pass the request data. A user can also add additional fields, such as those that the user requires for defining an event.

A user can create the addservc.jsp form, which allows the user to add a new service to an application view. This form can be EIS-specific. The addservc.jsp form for a sample adapter can be given by:

```
<%@ taglib uri='/WEB-INF/taglibs/adk.tld' prefix='adk' %>
<form method='POST' action='controller'>
    <table>
        <tr>
            <td><adk:label name='serviceName' required='true'/>
                </td>
```

-continued

```
            <td><adk:text name='serviceName' maxlength='100'
                size='50'/></td>
        </tr>
        <tr>
            <td colspan='2'><adk:submit name='addservc_submit'
                doAction='addservc'/></td>
        </tr>
    </table>
</form>
```

A user can include a tag library using a line such as <%@taglib uri='/WEB-INF/taglibs/adk.tld' prefix='adk' %>. This line can instruct the JSP engine to include an ADK tag library. The ADK tag library can support a user-friendly form validation provided by an ADK.

A user can post the ControllerServlet using a line such as <form method='POST' action='controller'>. This line instructs the form to post to the ControllerServlet. The ControllerServlet can be configured in the web.xml file for the web application and can be responsible for delegating HTTP requests to a method on a RequestHandler. The user does not need to provide any code to use the ControllerServlet, but can be required to supply the initial parameters.

Using Web Services with Application Views

A Web service can access an enterprise system or application through a component such as an application view control. An enterprise system, or Enterprise Information System (EIS), is typically a large-scale business application such as a Customer Relationship Management (CRM), Enterprise Resource Planning (ERP), or Human Resources (HR) application. Examples of an EIS can include an SAP, PeopleSoft, or Siebel system. An application view control can use application views defined with an application integration (AI) component such as those described above. An application view control can allow a web service to access an enterprise application using an existing application view.

An application view control can allow web services to interact with enterprise applications using, for example, simple Java APIs. These APIs allow a web service developer to access an enterprise application even if the developer does not know any of the details of the application's implementation.

One example of an application view component allows a Web service developer to invoke application view services both synchronously and asynchronously, and to subscribe to application view events. In both the service and event cases, the developer uses simple Java APIs. The developer need not understand XML, or the particular protocol or client API for the enterprise application.

An application view control can be designed to make it easy to use an existing, deployed application view from within Web services. An application view control may not be capable of allowing a user to develop and deploy application views.

A Web services control, such as an application view control, can provide a common model to interacting with resources from within a web service. If a resource such as a relational database is accessed through web services control, the interaction with the resource can be greatly simplified because the underlying control implementation can take care of most of the details.

All Web services controls can expose Java interfaces that may be invoked directly from web service code. All web service controls can be used the same way. A user can create an instance of the control and then invoke the methods for the control and implement the handlers for any control callback.

Application View Control

An application view control can be customized in several ways. For instance, a user can modify the properties of the control itself, the properties of the control's methods, or the XML maps on the control's methods. For example, an application view control can expose an application view identity property, such as av-identity, with the name, user-id and password attributes. Each method of an Application View control can expose a service property, such as av-service, that binds the application view method to a service of the application view control. Each method of an application view control can also have associated XML maps, such as parameter-xml and return-xml maps, and each callback can have an associated parameter-xml map.

To update an application view control when the target application view changes, a user can regenerate the application view control. The old application view control "control file," or CTRL file, can be renamed before generating a new application view control with the same name. If the XML maps in the old application view control were modified, a user can copy and paste them to the new CTRL file using any appropriate text editor.

Using Callbacks

Callbacks can be used to notify a client of a web service that an event has occurred. For example, it may be desirable to notify a client when the results of a client request are ready. It may also be desirable to notify the client when an event is pushed to a message queue from an enterprise system for a topic to which the client subscribed. Callbacks can be thought of as messages to the client. When a user adds a method to a web service, the user is defining a message that a client can send to the user to request that some operation be performed. When defining a callback, a user is defining a message that the web service will send to the client to notify the client of an event that has occurred in the user's web service or in the enterprise system. An application server can allow the user's web service to receive XML and SOAP messages, and can route them automatically to the user's web service. In order to receive callbacks, the client should be operating in an environment that provides the same services. This typically means the client is running in an application server or web server. If the client is not running in an environment that provides the necessary infrastructure, the client may not be capable of receiving callbacks from the user's web service.

The notion that callbacks are messages to the client can be important if a user wants to apply XML maps to callback parameters or return values. The parameters to a callback can be placed in the outgoing message to the client, and the return value can be converted from the resulting incoming message from the client. This can seem strange, because programmers typically associate all parameters with incoming data and return values with outgoing data.

In a conversational web service, it is possible that a callback will not return when the user is expecting the callback to return. Because method calls that are part of the same conversation can be serialized, a callback invoked during the conversation may not happen until the current method returns. If that method takes a long time, the callback result may not be available when the user expects it. If the code relies on the callback result, the user can add a timer control to your web service to check for the callback result, and can decide on an appropriate action if the callback has not yet occurred.

As callbacks are messages to the client, and since callbacks are by definition separated from the original request to which the callback is a response, callbacks can appear as unsolicited messages to the client's host. Many hosts may not allow receipt of unsolicited network traffic, either by directly rejecting such traffic or by nature of being protected by firewalls or other network security apparatus. Clients that run in such an environment may therefore not be capable of receiving callbacks.

The protocol and message format used for callbacks can always be the same as the protocol and message format used by the start method that started the current conversation. It can cause an error to attempt to override the protocol or message format of a callback.

Application View Control Interface

The syntax used for an application view control interface can be given by, for example:

public interface ApplicationViewControl extends Control

The methods of such an interface can be invoked by any web service with an application view control instance. Examples of such methods can include the following:

public void beginLocalTransaction( ) throws Exception

This method can begin a local transaction on this control. This control will begin a local transaction on the underlying application view instance. All work done by this control instance between this call and a call to a method such as commitLocalTransaction( ) or rollbackLocalTransaction( ) can be committed or rolled back, respectively, as a unit. If the underlying adapter used by the application view for this control does not support local transactions, an exception can be thrown.

public void commitLocalTransaction( ) throws Exception

This method can commit the active local transaction for this control. All work done since the last call to a method such as beginLocalTransaction( ) can be committed into the EIS's permanent state. If the underlying adapter used by the application view for this control does not support local transactions, an exception can be thrown.

public void disableEventDelivery( ) throws Exception

This method can indicate that this control should no longer deliver event notifications. Calling this method when event delivery is not enabled has no effect.

public void enableEventDelivery( ) throws Exception

This method can indicate that this control instance should provide event notifications to its container JWS instance. The containing JWS must be conversational. Events can be delivered using a receive mode such as a MODE_ALLOW_DUPS receive mode. Calling this method when event delivery is already enabled mayhave no effect.

public void enableEventDelivery(String receiveMode) throws Exception

This method can indicate that this control instance should provide event notifications to its container JWS instance using the specified receive mode. The containing JWS must be conversational. Calling this method when event delivery is already enabled is has no effect.

A receiveMode can be used to specify the mode in which all events should be received. This can be one of the MODE_XXX fields defined below.

public String getEventReceiveMode( )

This method can return the receive mode specified in the latest call to enableEventDelivery( ) or null if event delivery is not enabled. Returned mode can be one of the MODE_XXX fields defined below.

public void importJar(String jarFileName, boolean overwrite, boolean deploy, List errors, PrintWriter out, boolean quiet) throws Exception This method can import a previously exported application view JAR file. This file can contain ApplicationView, ConnectionFactory, Folder, and Schema definitions.

A filename for the .jar file, such as may be held by jarFileName, can be a fully qualified path to the jar to be imported, or a resource name suitable for finding the jar on the system classpath (e.g. samples/appview/Sample1.jar). This method can interpret jarFileName first as a path, and if the file does not exist, can attempt to find it on the classpath.

Various other methods can also be used. For example, an "overwrite" flag can indicate whether imported objects should overwrite any existing objects already in the repository. A "deploy" flag can indicate whether deployable imported objects should be deployed automatically after the import. An "errors" list can be used that, upon completion of an import, will contain any non-fatal errors that occurred. Fatal errors can be reported via an Exception thrown by this method.

An "out" method can be a PrintWriter instance to which all messages will be written. If null, no messages may be written. A "quiet" method can be a flag that indicates whether an import should operate quietly (producing fewer messages). An Exception can be thrown if any fatal error occurs during the import.

Another method that can be used is given by:

public String importJar(String jarFileName) throws Exception

This method can import a previously exported application view JAR file using standard options. This method can overwrite any existing objects with the same name as those in the jar, can deploy deployable objects, and can print a summary of operations to System.out. If non-fatal errors occur, this method can print a summary of those errors to System.out.

A filename for a JAR file may be contained in jarFileName, which can contain a fully qualified path to the jar to be imported, or a resource name suitable for finding the jar on the system classpath (e.g. samples/appview/Sample1.jar). This method can interpret jarFileName first as a path, and if the file does not exist, can attempt to find it on the classpath.

A method such as "public boolean isEventDeliveryEnabled( )" can return a value of "true" if event delivery is enabled, and "false" otherwise. This can be true after a call to enableEventDelivery( ) and before a call to disableEventDelivery( ).

A method such as "public void rollbackLocalTransaction( ) throws Exception" can rollback the active local transaction for this control. All work done since the last call to beginLocalTransaction( ) can be discarded. If the underlying adapter used by the application view for this control does not support local transactions, an exception can be thrown.

A user can also specify modes of operation, such as "static public final String MODE_ALLOW_DUPS." Such a mode can be used if it is acceptable to receive a given event more than once. This may only be possible in the event of a system shutdown or failure, and may not occur during normal operations. This mode can be the default and can give the best performance. A mode such as "static public final String MODE_ONCE_AND_ONLY_ONCE" can be used if it is critical to receive all events and that each event be received only once, even in the event of a system failure. This mode can yield performance somewhat lower than when using MODE_ALLOW_DUPS.

Events

An onEvent event, such as "public void onEvent(Object event) throws Exception;" can be generated whenever an application view event is received. This method can be private, and not used by JWS clients. The "event" object can represent the event in the EIS.

An event such as "public void onAsyncServiceResponse (Object asr) throws Exception;" can be generated whenever an application view asynchronous response is received. This method can be private, and not used by JWS clients. Here, the event can be the asynchronous response object representing the response from an asynchronous service invocation.

An event such as "public void onAsyncServiceError (String requestID, String errorMessage) throws Exception" can be used, which is generated whenever an application view asynchronous request ends in error. Here, requestID is the identifier returned when this request was submitted, and errorMessage can contain the text of the error that has occurred.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system, having a processor, for connecting a client application to an enterprise system, said system comprising:

an application view component that adds a layer of abstraction to the enterprise system and exposes the enterprise system for the client application as a business process;

a resource adapter that establishes a connection to the enterprise system and exposes internal functionality of the enterprise system to the client application, the resource adapter further defining at least one of services and events in the enterprise system that are available to the client application by associating the internal functionality of the enterprise system with said services and events;

wherein each application view component is specific to a single resource adapter and provides access to the internal functionality exposed by the single resource adapter;

an interface for the resource adapter, the interface allowing the client application to access the application view component in order to perform at least one of: creating, defining, deploying and testing said application view component wherein said interface is used to add the services and events exposed by the resource adapter to the application view component; and a business process engine used to graphically construct and maintain the business process, wherein the business process reacts to events and invokes the services exposed by the resource adapter;

wherein the application view component converts steps of the business process into services on the resource adapter thereby invoking the functionality in the enterprise system.

2. A system according to claim 1, wherein:
the interface is a design-time graphical user interface.

3. A system according to claim 1, wherein:
the interface includes a set of server pages.

4. A system according to claim 1, further comprising:
a server hosting the resource adapter and the interface.

5. A system according to claim 1, wherein: the interface is Web-based.

6. A system according to claim 1, further comprising:
a Web application component that allows the interface to be built using server pages.

7. A system according to claim 6, wherein:
the Web application component further comprises tools selected from the group consisting of server page templates, a tag library, and a script library.

8. A system according to claim 1, wherein:
the resource adapter is an event adapter that allows the enterprise system to initiate communication with the client application by triggering an event; whereby the application view component can extract data about the event from the enterprise system through the event adapter and propagate the data to the client application.

9. A system according to claim 8, wherein:
the application view component propagates the data in an extensible markup language document.

10. A system according to claim 8, wherein:
the event adapter extracts data about the event from the enterprise system, and makes that data available to the application view component.

11. A system according to claim 8, wherein:
the event adapter transforms the data from a format specific to the enterprise system to an extensible markup language document.

12. A system according to claim 1, further comprising:
a connector architecture mechanism that provides at least one of connection pooling, transaction management, and security services for the resource adapter.

13. A system according to claim 1, wherein:
the resource adapter is a service adapter that invokes a service in the enterprise system, the service receiving requests from the application view component and returning responses to the application view component through the service adapter.

14. A system according to claim 13, wherein:
the service adapter passes requests and responses as extensible markup language documents.

15. A system according to claim 13, wherein:
the service adapter invokes a service that allows asynchronous messaging between the application view and the enterprise system.

16. A system according to claim 13, further comprising:
a connection factory creates connections for the service adapter.

17. A system according to claim 1, further comprising:
a call-back listener handles a response for the application view that is received from the enterprise system.

18. A system according to claim 1, further comprising:
a queue that receives a request from the application view component and stores the request until the request is passed to the enterprise system.

19. A system according to claim 1, further comprising:
a security mechanism that maps authorization information across the path of a request from the application view component through the resource adapter to the enterprise system.

20. A system according to claim 1, further comprising:
a run-time engine that hosts the resource adapter.

21. A system according to claim 20, wherein:
the run-time engine manages connections to the enterprise system.

22. A system according to claim 1, further comprising:
an integration framework that provides an interface for each resource adapter.

23. A system according to claim 1, wherein:
the interface allows the client application to access the application view component to do at least one of create, add services to, add events to, and edit the application view component.

24. A system according to claim 1, wherein:
the interface further comprises an application view console that helps a user access, organize, and edit any application view component for the enterprise system.

25. A system according to claim 1, wherein:
the interface is a design-time interface comprising a web application bundled as a file, the web application including at least one of server page, hypertext markup language and image files.

26. A system according to claim 1, wherein:
the interface contains forms that can be processed using servlets.

27. A system according to claim 1, wherein:
the interface includes a plurality of server pages, each server page calling a servlet to invoke a transaction in the enterprise system.

28. A system according to claim 1, wherein:
the interface includes server pages selected from the group consisting of display pages, login pages, confirm connection pages, application view administration pages, add event pages, add service pages, edit event pages, edit service pages, deploy application view pages, and summary pages.

29. A system according to claim 1, further comprising:
a design-time framework that provides a set of templates for rapidly assembling the interface.

30. A system according to claim 1, further comprising:
an application view descriptor that provides at least one of connection parameters, list of events, list of services, log levels, and pool settings for the application view component.

31. The system of claim 1, wherein the resource adapter further includes a set of connection parameters to create a connection to the enterprise system.

32. The system of claim 1, further comprising:
an application view control invoked directly from web service code, wherein the application view control enables the web service to interact with the application view component.

33. The system of claim 1, wherein said interface further provides one or more of the following:
a display page to create the look and feel of the application view component;
a login page;
a connection form that specifies connection parameters for the enterprise system;
a summary of an undeployed application view component;
an add event page to add a new event to the application view component;

an add service page to add a new service to the application view component;

an edit event page to edit an existing event on the application view component;

an edit service page to edit an existing service on the application view component;

a deploy application view page to specify deployment properties for the application view component; and a summary page to display data associated with the application view component.

34. A computer program product, stored on a computer readable storage medium, for execution by a server computer for providing an interface for invoking functionality in an underlying enterprise system, comprising:

computer code for providing an application view component that adds a layer of abstraction to the enterprise system and exposes the enterprise system for a client application as a business process;

computer code for providing a resource adapter that establishes a connection to the enterprise system and exposes internal functionality of the enterprise system to the client application, the resource adapter defining at least one of services and events in the enterprise system that are available to the client application by associating the internal functionality of the enterprise system with said services and events;

wherein each application view component is specific to a single resource adapter and provides access to the internal functionality exposed by the single resource adapter;

computer code for providing an interface for the resource adapter, the interface allowing the client application to access the application view component in order to perform at least one of: creating, defining, deploying and testing said application view component wherein said interface is used to add the services and events exposed by the resource adapter to the application view component; and computer code for providing a business process engine used to graphically construct and maintain the business process, wherein the business process reacts to events and invokes the services exposed by the resource adapter;

wherein the application view component converts steps of the business process into services on the resource adapter thereby invoking the functionality in the enterprise system.

35. A computer system comprising:

a processor;

object code executed by said processor, said object code configured to:

provide an application view component that adds a layer of abstraction to the enterprise system and exposes the enterprise system for a client application as a business process;

provide a resource adapter that establishes a connection to the enterprise system and exposes internal functionality of the enterprise system to the client application, the resource adapter defining at least one of services and events in the enterprise system that are available to the client application by associating the internal functionality of the enterprise system with said services and events;

wherein each application view component is specific to a single resource adapter and provides access to the internal functionality exposed by the single resource adapter;

provide an interface for the resource adapter, the interface allowing the client application to access the application view component in order to perform at least one of: creating, defining, deploying and testing said application view component wherein said interface is used to add the services and events exposed by the resource adapter to the application view component;

provide a business process engine used to graphically construct and maintain the business process, wherein the business process reacts to events and invokes the services exposed by the resource adapter;

wherein the application view component converts steps of the business process into services on the resource adapter thereby invoking the functionality in the enterprise system.

36. A computer implemented method for connecting a client application to an enterprise system, comprising:

providing an application view component that adds a layer of abstraction to the enterprise system and exposes the enterprise system for the client application as a business process;

providing a resource adapter that establishes a connection to the enterprise system and exposes internal functionality of the enterprise system to the client application, the resource adapter defining at least one of services and events in the enterprise system that are available to the client application by associating the internal functionality of the enterprise system with said services and events;

wherein each application view component is specific to a single resource adapter and provides access to the internal functionality exposed by the single resource adapter;

providing an interface for the resource adapter, the interface allowing the client application to access the application view component in order to perform at least one of: creating, defining, deploying and testing said application view component wherein said interface is used to add the services and events exposed by the resource adapter to the application view component; and providing a business process engine used to graphically construct and maintain the business process, wherein the business process reacts to events and invokes the services exposed by the resource adapter;

wherein the application view component converts steps of the business process into services on the resource adapter thereby invoking the functionality in the enterprise system.

* * * * *

UNITED STATES PATENT AND TRADEMARK OFFICE
CERTIFICATE OF CORRECTION

PATENT NO. : 7,516,440 B2  
APPLICATION NO. : 10/271162  
DATED : April 7, 2009  
INVENTOR(S) : Upton Page 1 of 1

It is certified that error appears in the above-identified patent and that said Letters Patent is hereby corrected as shown below:

Title Page; item (56);  
On page 3, in column 2, under "Other Publications", line 30, delete "Kunsitty," and insert -- Kunisetty, --, therefor.

On page 3, in column 2, under "Other Publications", line 53, delete "Achitectures" and insert -- Architectures --, therefor.

On page 3, in column 2, under "Other Publications", line 53, before "J2EE" delete "the".

On page 4, in column 1, under "Other Publications", line 21, delete "Disseration," and insert -- Disseration, --, therefor.

On page 4, in column 2, under "Other Publications", line 9, delete "Jave" and insert -- Java --, therefor.

In column 18, line 55, delete "mayhave" and insert -- may have --, therefor.

Signed and Sealed this

Eighth Day of June, 2010

David J. Kappos  
*Director of the United States Patent and Trademark Office*